United States Patent [19]

Hasegawa

[11] Patent Number: 4,771,170

[45] Date of Patent: Sep. 13, 1988

[54] OPTICAL COORDINATE INPUT DEVICE HAVING LIGHT ADJUSTING MEANS LOCATED IN FRONT OF EACH LIGHT RECEIVING MEANS

[75] Inventor: Kazuo Hasegawa, Furukawa, Japan

[73] Assignee: Alps Electric Co., Ltd., Japan

[21] Appl. No.: 86,955

[22] Filed: Aug. 19, 1987

[30] Foreign Application Priority Data

Oct. 31, 1986 [JP] Japan ............................ 61-166699[U]
Jan. 20, 1987 [JP] Japan ............................. 62-7056[U]

[51] Int. Cl.$^4$ ............................................... G01V 9/04
[52] U.S. Cl. ..................................... 250/221; 250/201
[58] Field of Search ............... 250/221, 222.5, 201 R, 250/205; 350/374, 375

[56] References Cited

U.S. PATENT DOCUMENTS 3,764,813 10/1973 Clement et al. ..................... 250/221
4,507,557 3/1985 Tsikos ................................. 250/221

*Primary Examiner*—David C. Nelms
*Assistant Examiner*—William L. Oen
*Attorney, Agent, or Firm*—Guy W. Shoup; Leighton K. Chong; Paul J. Winters

[57] ABSTRACT

An optical coordinate input device wherein there is no possibility of operation in error or of destruction of a light receiving element and a correct coordinate signal can be produced even if external light of a high intensity acts upon the light receiving element. The device comprises light amount adjusting means of the transmissive type located in front of light receiving elements, and controlling means for controlling the amount of light to be passed through the light amount adjusting means in response to an amount of light incident to the light receiving elements. Thus, if there is the possibility that an output value of the light receiving elements may reach a saturation condition due to external light of a high intensity, the light transmittivity of the light amount adjusting means is lowered to decrease the amount of external light to be received the light receiving elements.

5 Claims, 6 Drawing Sheets

OPTICAL COORDINATE INPUT DEVICE HAVING LIGHT ADJUSTING MEANS LOCATED IN FRONT OF EACH LIGHT RECEIVING MEANS

BACKGROUND OF THE INVENTION

This invention relates to an optical coordinate input device mounted in front of a display device for detecting a coordinate position on a display surface of the display device to input the same to a computer.

As a coordinate input device for manual input to a computer, there are various types such as, for example, an electromagnetic induction type, an electrostatic capacity type, a transparent electrode type and an optical detection type. Among those types, attention is directed to the optical detection type due to its relatively high reliability and operability. A coordinate input device of the optical detection type is normally mounted in front of a display device, and as a point on a display surface of the display device is touched by a finger to interrupt paths of light beams, a coordinate position of the point is specified without contacting a detecting device.

Such optical coordinate input devices are disclosed in U.S. Pat. Nos. 3,764,813, 3,775,560, 3,860,754 and 4,205,304, and optical coordinate input devices which include means for preventing an error of detection are disclosed in U.S. Pat. Nos. 4,243,879, 4,585,940 and 4,591,710.

Such an optical coordinate input device is normally located in front of an image display device such as a CRT display or an LCD and is used for coordinate input to a computer. An optical coordinate input device conventionally includes two light emitting element arrays each including a large number of light emitting elements and extending along two sides in directions of the X- and Y-axes of an outer periphery of a front surface of a screen of a CRT display or the like, and two light receiving element arrays each including a large number of light receiving elements and extending along the other two sides in the directions of the X- and Y-axes of the outer periphery of the front surface of the screen and in an opposing relationship to the light emitting elements. The light emitting elements are scanned to be successively selectively driven by a multiplexer while the opposing light receiving elements are successively selected so that when a light signal developed from one of the light emitting element is interrupted by a finger or the like during such scanning, the opposing light receiving element may detect it in order to produce coordinate signals.

Figure 9:
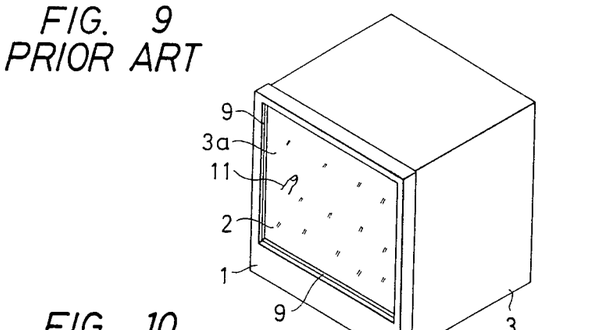
FIG. 9 is a perspective view of a conventional optical coordinate input device mounted in front of a display device.
Figure 10:
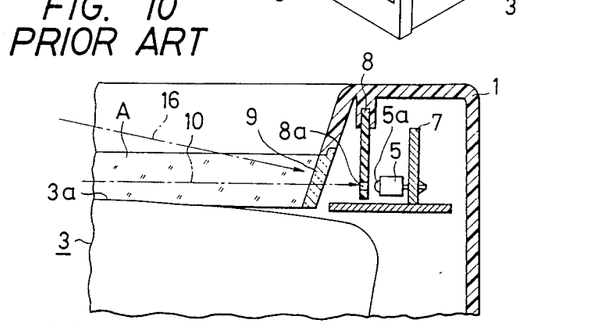
FIG. 10 is a partial cross sectional view of the coordinate input device of FIG. 9.
Figure 11:
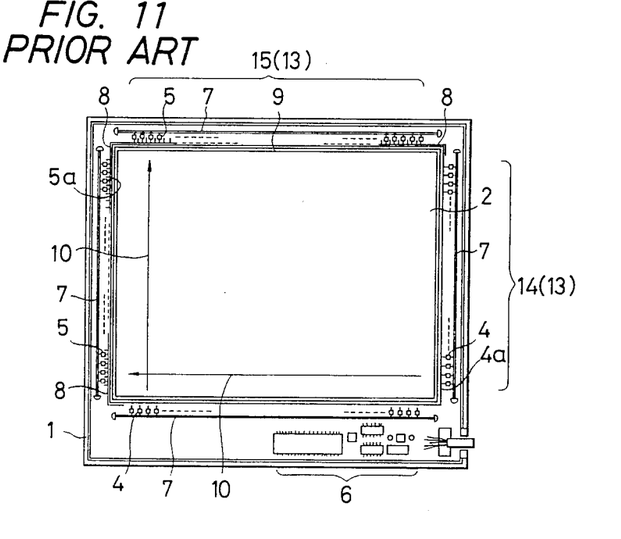
FIG. 11 is a rear elevational view illustrating an internal structure of the coordinate input device of FIG. 9 with a rear cover removed.

An exemplary one of such conventional coordinate input devices of the optical detection type is shown in FIGS. 9 to 11. FIG. 9 is a perspective view of a coordinate input device mounted in front of a display device, FIG. 10 a partial cross sectional view showing a portion of the coordinate input device of FIG. 9 in which a light receiving element is located, and FIG. 11 a rear elevational view illustrating an internal structure of the coordinate input device of FIG. 9 with a rear cover removed.

Referring to FIGS. 9 to 11, the coordinate input device includes as principal components a frame member 1 of a substantially rectangular shape having an opening 2 at a central portion thereof, two rows of a large number of light emitting elements 4 such as LED's and two rows of a large number of light receiving elements 5 such as phototransistors arranged on a rear face of the frame member 1, that is, between the frame member 1 and peripheral edge portions of a display surface 3a of a display device 3 which may be a CRT (cathode ray tube) or the like, and an operating device 6 for detecting a position at which light paths 10 are interrupted within an operating area A in front of the display surface 3a of the display device 3 from combinations of the light emitting elements 4 and the light receiving elements 5 located in an opposing relationship to each other over the operating area A of the display device 3. Thus, an optical element train 13 in the form of a framework is formed by two rows 14 of the light emitting elements 4 and two rows 15 of the light receiving elements 5 which make opposing sides to each other.

The light emitting elements 4 and the light receiving elements 5 are fixedly mounted on a base plate 7 located within the frame member 1 such that their light emitting portions 4a and light receiving portions 5a may oppose to each other in individual pairs, and a light shield plate 8 is located in front of the light receiving portions 5a of the light receiving elements 5 and has a large number of light passing holes 8a of a predetermined area formed therein for allowing the light receiving elements 5 to receive only incoming light beams emitted from the individual paired light emitting elements 4. Further, in front of the light shield plate 8 and the light emitting elements 4, that is, on peripheral ridges of the operating area A, an infrared ray filter 9 for selectively passing infrared rays therethrough is mounted on the frame member 1 along the entire periphery of the operating area A. Accordingly, the light paths 10 which cannot be observed is formed within the operating area A in front of the display face 3a via the infrared ray filter 9.

Now, an inputting principle of the coordinate input device having such a construction as described above will be described. If, for example, a finger 11 touches a particular position on the display surface 3a for inputting as shown in FIG. 9, particular light paths 10 passing the position are interrupted by the finger 11, which will allow coordinates of the position to be specified. In particular, if the light emitting elements 4 of the light emitting element rows 14 are caused to successively emit light to effect scanning, light paths 10 interrupted by the finger 11 can be detected by the light receiving elements in the x and y directions. The light paths 10 are then determined by the operating device 6, and consequently the coordinates of the position are input to a host computer not shown.

Figure 8:
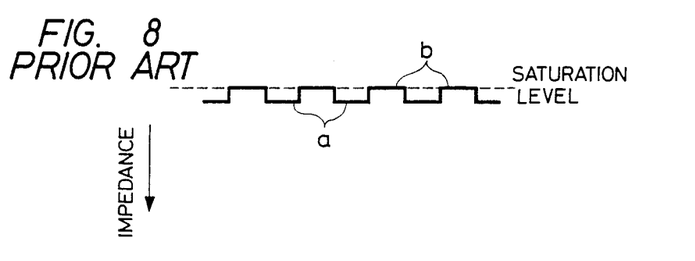
FIG. 8 is a similar view illustrating operation of a conventional optical coordinate input device.

However, in such a conventional coordinate input device as described above, since each of the light passing holes 8a in the light shield plate 8 located in front of the light receiving portions 5a of the light receiving elements 5 is required to have an area of such a degree that it will not degrade the detecting efficiency of the light receiving element 5, there is the possibility that an external light beam 16 of a high intensity may be introduced to any of the light receiving elements 5 obliquely from above as shown in FIG. 10 so that output of the light receiving elements 5 may be brought into a saturated condition. If the light receiving element 5 is brought into a saturated condition, it can no more detect light from the opposing light emitting element 4. In particular, if disturbant light of a high intensity is received by a light receiving element so that the impedance of the light receiving element is raised to a saturation level or an almost saturation level (as indicated at a in FIG. 8), when the light receiving element receives a light signal from an opposing light emitting element so that the impedance thereof is lowered, the saturation level will be reached in a moment (as indicated at b in FIG. 8). In this instance, the extent or degree of change of the impedance of the light receiving element is so small that reception of the light signal cannot be detected correctly, and accordingly a coordinate signal in error may readily be obtained.

Accordingly, if external light of a high intensity is introduced to the light receiving elements 5, they may operate in error, which will result in considerable deterioration in reliability of the entire device. Further, there is the possibility that if external light of a particularly high intensity such as flash light of a camera or sunlight should act on the light receiving elements 5, they may be oversaturated and thus resulted in destruction of the light receiving elements 5.

SUMMARY OF THE INVENTION

It is an object of the present invention to provide an optical coordinate input device wherein there is no possibility of operation in error or of destruction of a light receiving element even if external light of a high intensity acts upon the light receiving element.

It is another object of the invention to provide an optical coordinate input device which can produce a correct coordinate signal even if a light receiving element thereof is acted upon by incident disturbant light of a high intensity.

In order to attain the objects, according to the present invention, a coordinate input device of the light detection type which includes an optical element train in the form of a framwork which is constituted from a large number of light emitting elements and a large number of corresponding light receiving elements both arranged in rows and wherein a position at which light paths defined in front of a display surface of a display device between the light emitting elements and the light receiving elements are interrupted is detected to input coordinates of the position on the display surface of the display device, comprises light amount adjusting means of the transmissive type located in front of light receiving portions of the light receiving elements, and controlling means for controlling the amount of light to be passed through the light amount adjusting means in response to an amount of light incident to the light receiving elements.

Preferably, the light amount adjusting means may include a liquid crystal plate of the transmissive type. Further, the passing light amount adjusting means may preferably include PLZT therein.

According to another aspect of the invention, an optical coordinate input device of the type wherein a large number of light emitting elements are arranged in rows along two sides of directions of the X- and Y-axes while a large number of light receiving elements are arranged in rows along the other two sides of the directions of the X- and Y-axes and in an opposing relationship to the light emitting elements, and the light emitting elements are scanned to be selectively driven one after another to emit light while those of the light receiving elements which oppose to the selectively driven light emitting elements are selected successively whereby coordinate signals are obtained from positions of those of the light receiving elements which do not receive light signals emitted from the selectively driven light emitting elements, comprises passing light amount adjusting means located in front of the light receiving elements and including a crystal optical function element having an electro-optical effect or a magneto-optical effect or else an acoustic-optical effect, disturbant light detecting means for detecting the intensity of disturbant light introduced to the light receiving elements, light emitting element driving means for adjusting the amount of light to be emitted from the light emitting elements in response to a detection signal from the disturbant light detecting means, and driving adjusting means for adjusting the light transmittivity of the passing light amount detecting means in response to the detection signal from the disturbant light detecting means.

Preferably, the intensity of disturbant light is detected by the disturbant light detecting means from one of the light receiving elements which does not oppose to the selectively driven light emitting elements.

Accordingly, if external light of a high intensity acts upon the light receiving elements so that output values of the light receiving elements reach their saturated or near saturated condition, the controlling means operates to lower the light transmittivity of the light amount adjusting means. Accordingly, the light receiving elements are maintained in an unsaturated condition in which they can correctly detect light from the opposing light emitting elements. Besides, if disturbant light of a high intensity is detected by the disturbant light detecting means, the light transmittivity of the passing light amount adjusting means located in front of the light receiving elements are lowered by the driving adjusting means to change the impedance of the light receiving elements to a value far from the saturation level while the amount of light to be emitted from the light emitting elements is increased by the light emitting element driving means. As a result, even if external light of such a high intensity acts upon the optical coordinate input device, whether or not a light signal developed from a light emitting element is interrupted is detected assuredly by an opposing light receiving element.

The above and other objects, features and advantages of the present invention will become apparent from the following description and the appended claims, taken in conjunction with the accompanying drawings.

DETAILED DESCRIPTION OF THE PREFERRED EMBODIMENTS

Referring first to FIGS. 1, 2(a), 2(b) and 3, there is shown an optical coordinate input device according to a first embodiment of the present invention. In those figures, like parts or components are denoted by like reference numerals or symbols to those of FIGS. 9 to 11 in which the conventional arrangement described hereinabove is shown.

Figure 1:
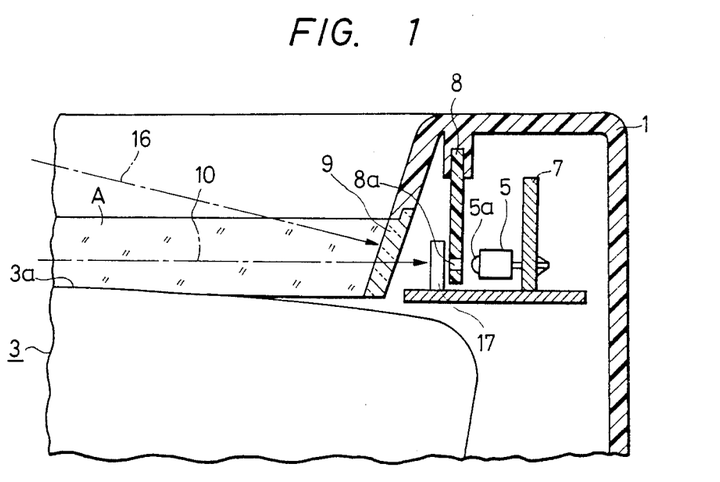
FIG. 1 is a partial cross sectional view of an optical coordinate input device showing a first embodiment of the present invention.

As seen in FIG. 1, the coordinate input device additionally includes a liquid crystal plate 17 of the transmissive TN type located in front of light receiving portions 5a of light receiving elements 5 via a light shield plate 8. Accordingly, a light beam which comes in along a predetermined light path 10 defined by and between each of the light receiving elements 5 and an opposing light emitting element and an external light beam 16 which comes in obliquely from above first pass through an infrared ray filter 9 and then through the liquid crystal plate 17 and a light passing hole 8a in the light shield plate 8 and thus reach the light receiving portion 5a of the light receiving element 5.

Figure 2A:
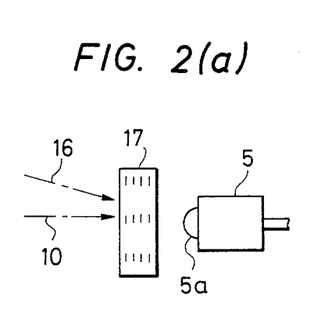
FIGS. 2(a) and 2(b) are schematic views illustrating distortions in molecular arrangement of a liquid crystal plate for use with the coordinate input device of FIG. 1.
Figure 2B:
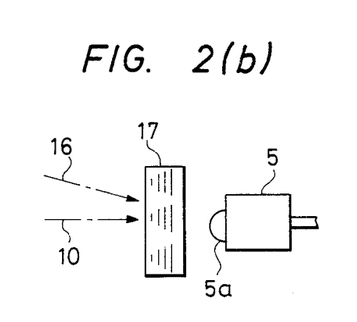

A liquid crystal cell of the transmissive TN type has, as well known in the art, a property that if a voltage is applied thereacross, the molecular arrangement thereof is distorted between electrodes thereby to change the light transmittivity thereof. Thus, in the case of the liquid crystal plate 17, the molecular arrangement is substantially parallel to the light path 10 as illustrated in FIG. 2(a) when no voltage is applied thereacross, but if a voltage is applied thereacross, the molecular arrangement is distorted a predetermined angle as illustrated in FIG. 2(b) so that the light transmittivity of the liquid crystal plate 17 in front of the light receiving portion 5a of the light receiving element 5 is lowered a predetermined amount.

Figure 3:
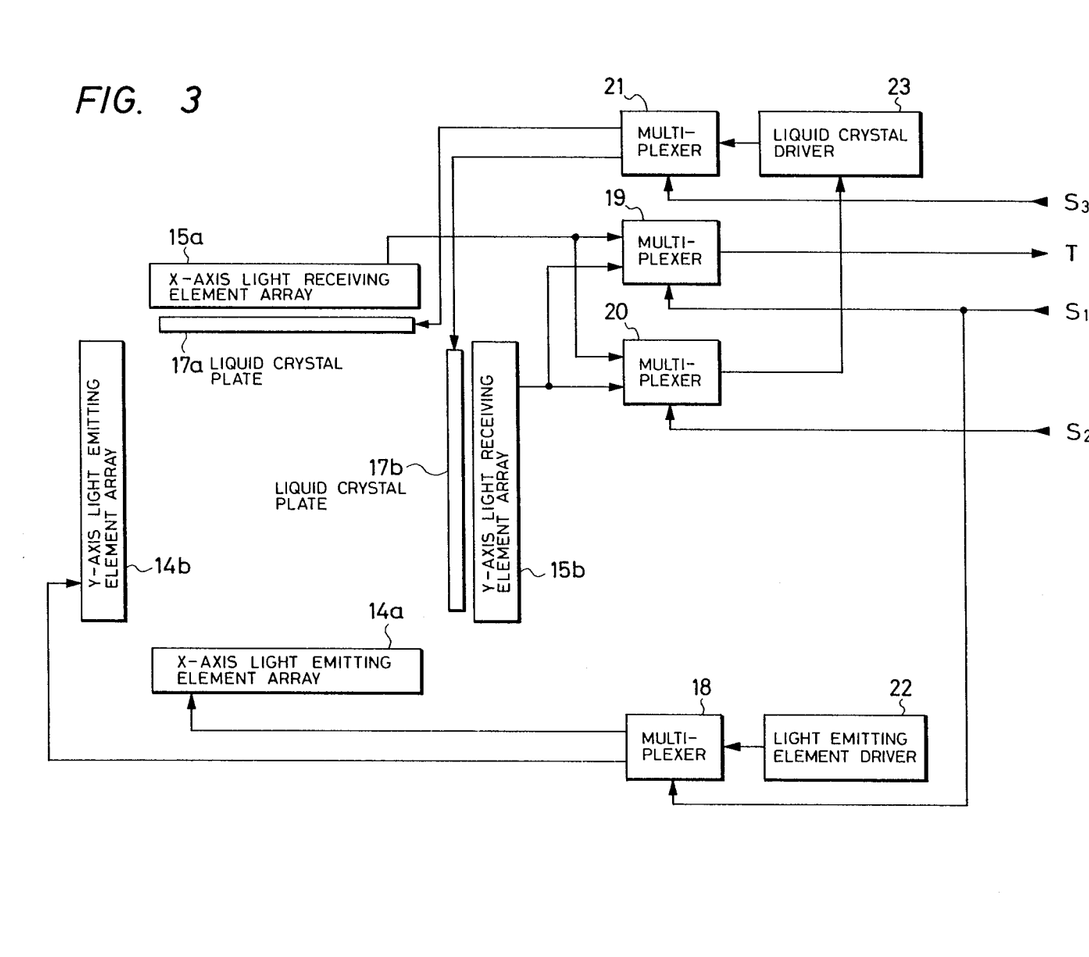
FIG. 3 is a diagrammatic representation showing means of the device of FIG. 1 for controlling the molecular arrangement of the liquid crystal plate of FIGS. 2(a) and 2(b)

FIG. 3 illustrates means for controlling the molecular arrangement of such a liquid crystal plate as described above. The arrangement shown includes an X-axis light emitting element row 14a, a Y-axis light emitting element row 14b, an X-axis light receiving element row 15a, a Y-axis light receiving element row 15b, a liquid crystal plate 17a, for the X-axis, another liquid crystal plate 17b for the Y-axis, multiplexers 18 to 21, a light emitting element driving circuit 22, and a liquid crystal driving circuit 23.

The multiplexers 18, 19 operate in response to a scanning signal $S_1$ to render the paired light emitting elements and light receiving elements operative one after another for the X- and Y-axes. Meanwhile, the multiplexer 20 operates in response to another scanning signal $S_2$ to select a particular one of a predetermined plurality of predetermined ones of the light receiving elements for each of the X- and Y-axes. On the other hand, the multiplexer 21 operates in response to a further scanning signal $S_3$ to select either one of the liquid crystal plate 17a for the X-axis and the liquid crystal plate 17b for the Y-axis.

In particular, during scanning for the X-axis, the multiplexer 20 selects at least one of the light receiving elements of the X-axis light receiving element row 15a which is not then selected by the multiplexer 19, and the liquid crystal driving circuit 23 is operated in accordance with an output value of the light receiving element selected by the multiplexer 20 while the molecular arrangement of the liquid crystal plate 17a for the X-axis is controlled via the multiplexer 21. Similarly, the molecular arrangement of the liquid crystal plate 17b for the Y-axis is controlled during scanning for the Y-axis. Thus, when a particular light receiving element which is selected because a paired light emitting element opposing to the same is not emitting light then produces an output value equal to a value in a near saturated condition thereof due to external light incident to the light receiving element, a voltage is applied to the liquid crystal plate 17a or 17b by the liquid crystal driving circuit 23. Consequently, the molecular arrangement of the liquid crystal plate 17a or 17b is changed from a condition as shown in FIG. 2(a) to another condition as shown in FIG. 2(b) so that the light transmittivity of the same is lowered. As a result, output values of the individual light receiving elements of the X-axis light receiving element row 15a or the Y-axis light receiving element row 15b are lowered uniformly. It is to be noted that when the light transmittivity of the liquid crystal plate 17a or 17b is lowered, the amount of light to be emitted from the X-axis light emitting element row 14a or the Y-axis light emitting element row 14b should be increased.

In this manner, when there is the possibility that the output value of a light receiving element may reach a saturated condition due to external light of a high intensity acting upon the mechanism, the light transmittivity of the liquid crystal plate 17a or 17b is lowered. Accordingly, such an undesirable situation that the light receiving element is brought into a saturated condition to cause an error of operation or is oversaturated to cause destruction thereof can be prevented.

It is to be noted that while in the embodiment described above the output value of a particular light receiving element in a light receiving element row is used as a reference value for controlling the molecular arrangement of a liquid crystal plate, otherwise an additional light receiving element for examining an influence of disturbant light may be provided independently of the light receiving element rows in order to control the molecular arrangement of the liquid crystal plates using the output value of the additional light receiving element as a reference value.

Now, a second embodiment of the present invention will be described in detail with reference to FIGS. 4 to 7.

Figure 4:
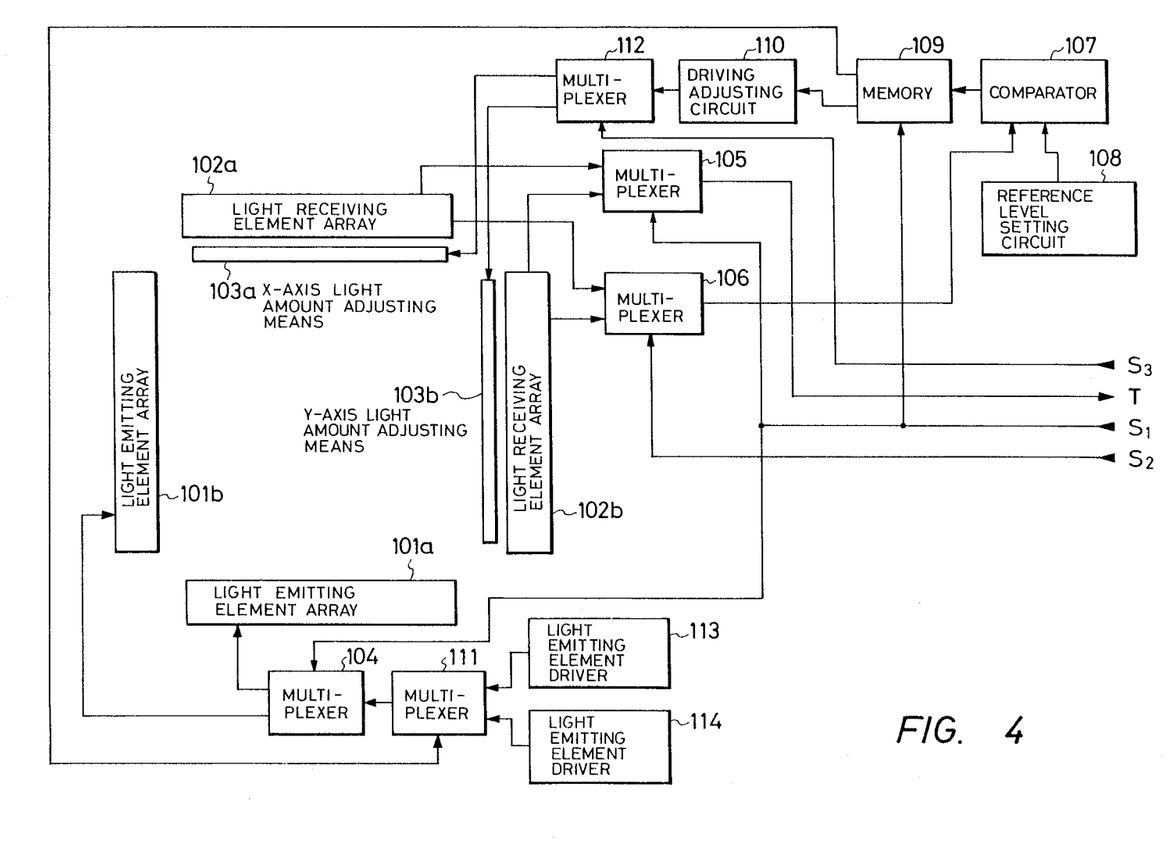
FIG. 4 is a diagrammatic representation of an optical coordinate input device illustrating a second embodiment of the invention.

Referring first to FIG. 4, a large number of light emitting elements are arranged in two rows along two perpendicular sides of directions of the X- and Y-axes of an outer periphery of a front surface of a screen of a CRT display or the like to form two light emitting element arrays 101a, 101b, and a large number of light receiving elements are arranged in two rows along the other two perpendicular sides of the directions of the X- and Y-axes in an opposing relationship to the light emitting elements to form two light receiving element arrays 102a, 102b. Passing light amount adjusting means 103a, 103b are located in front of the light receiving element arrays 102a, 102b, respectively. Thus, the light emitting elements of the light emitting element arrays 101a, 101b are scanned to be selectively driven one after another by a first multiplexer 104 to which a first scanning signal $S_1$ is delivered while the opposing light receiving elements of the light receiving elements arrays 102a, 102b are selected one after another by a second multiplexer 105 to which the first scanning signal $S_1$ is also delivered. Consequently, a signal T corresponding to an impedance of the selected light receiving element is developed from the second multiplexer 105. Further, a light receiving element which is not selected by the second multiplexer 105 is selected from the light receiving element array 102a or 102b by a third multiplexer 106 to which a second scanning signal $S_2$ is delivered, and accordingly a signal corresponding to an impedance of the light receiving element is delivered from the multiplexer 106 to a comparator 107. A reference level signal is delivered from a reference level setting circuit 108 to the comparator 107, and a result of comparison between the signal from the multiplexer 106 and the reference level signal is applied to and stored in a memory 109. The signal stored in the memory 109 is then delivered to a driving adjusting circuit 110 and a fourth multiplexer 111 in response to the scanning signal $S_1$. Output of the driving adjusting circuit 110 is suitably applied, via a fifth multiplexer 112 to which a third scanning signal $S_3$ is applied, to light amount adjusting means 103a, 103b for the X- and Y-axes for adjusting amounts of light to pass therethrough. Further, the fourth multiplexer 111 selects either one of outputs of first and second light emitting element driving circuits 113, 114 and delivers it to the first multiplexer 104 so as to drive the light emitting elements to emit light of a different intensity. It is to be noted that a disturbant light detecting means is constituted by the third multiplexer 106, the light receiving element selected by the third multiplexer 106, the comparator 106 and the reference level setting circuit 108, and a light emitting element driving means is constituted by the fourth multiplexer 111 and the first and second light emitting element driving circuits 113, 114 while a driving adjusting means is constituted by the memory 109, the driving adjusting circuit 110 and the fifth multiplexer 112.

Figure 5:
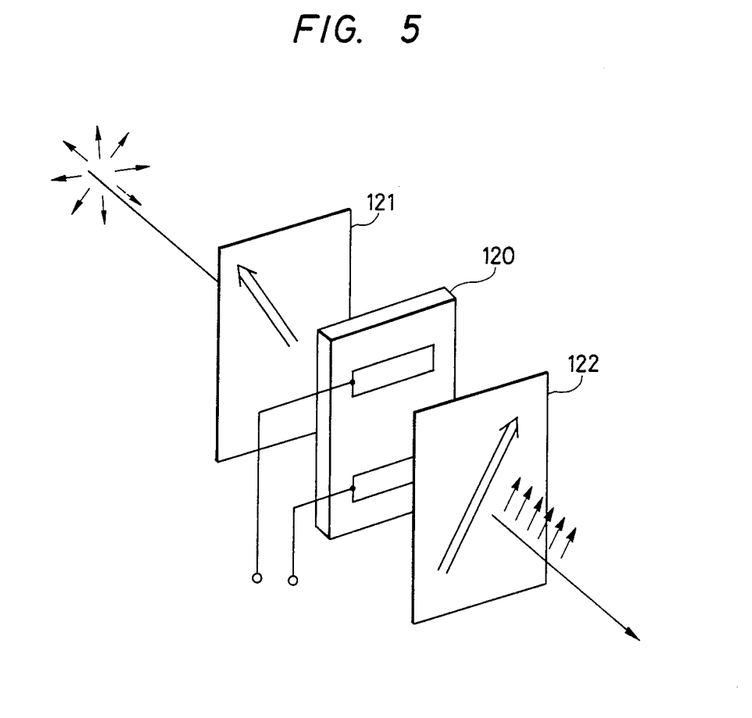
FIG. 5 is a schematic illustration showing an example of a passing light amount adjusting means of the device of FIG. 4.

Here, the passing light amount adjusting means 103a, 103b may each include a crystal optical function element having any one of properties of an electro-optical effect, a magneto-optical effect and an acoustic-optical effect. An example of such a crystal optical function element is illustrated in FIG. 5. Referring to FIG. 5, an optical function element 120 is a crystal of, for example, PLZT (ceramics of the (Pb, La)(ZR, Ti) $\theta$ families) having an electro-optical effect, and a polarizing element 121 and a light detecting element 122 are located on opposite sides of the optical function element 120 with their polarizing directions directed transversely to each other. Thus, as an electric field is applied to the optical function element 120 of PLZT, the polarizing direction of the PLZT is turned in accordance with the intensity of the applied electric field thereby to adjust the light transmittivity of the optical function element 120. On the other hand, where the optical function element 120 otherwise has a magneto-optical effect, the intensity of a magnetic field applied to the optical function element 120 from outside may be varied to change the angle of refraction of light or the like by the optical function element 120, or else where the optical function element 120 has an acoustic-optical effect, either the frequency or the intensity of sound waves applied to the optical function element 120 may be varied to change the direction or intensity of light diffracted by the optical function element 120, in order to adjust the light transmittivity of the optical function element 120.

Figure 6:
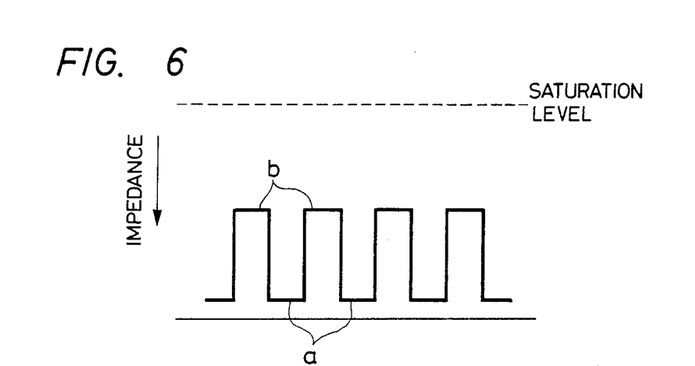
FIG. 6 is a diagram illustrating operation of the device of FIG. 4 when the intensity of disturbant light is relatively low.

With such a construction as described above, if the intensity of disturbant light received by a light receiving element selected by the third multiplexer 106 is low, the impedance of the light receiving element is high. Accordingly, the comparator 107 which compares a signal corresponding to the high impedance with a reference level signal delivers to the memory 109 a signal instructing the driving adjusting circuit 110 to maintain high light transmittivities of the light amount adjusting means 103a, 103b while another signal instructing the fourth multiplexer 111 to select the output of the first light emitting element driving circuit 113 for driving the light emitting elements of the light emitting element arrays 101a, 101b to emit light by a light amount of a low level is delivered to the fourth multiplexer 111. Consequently, disturbant light passes through the light amount adjusting means 103a, 103b of a high light transmittivity and is received by the light receiving elements, but since the intensity of such incident disturbant light is low, the impedance of the light emitting elements while only disturbant light is received is sufficiently high as seen at a in FIG. 6 comparing with a saturation level. Thus, if a light signal produced from a light emitting element is introduced into a light receiving element via the light amount adjusting means 103a, 103b, the impedance of the light receiving element is significantly lowered as seen at b in FIG. 6. Accordingly, reception of light is detected by such a large changing degree in impedance of the light receiving element.

Figure 7:
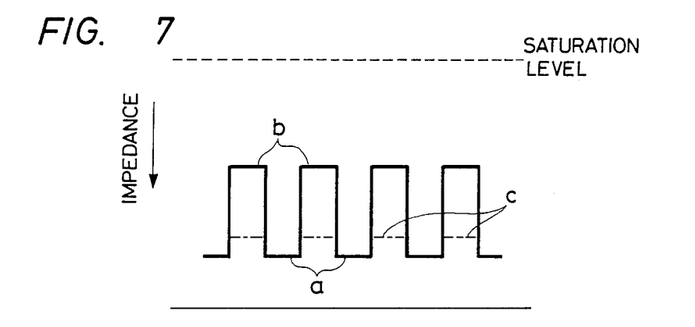
FIG. 7 is a similar view but illustrating operation of the device of FIG. 4 when the intensity of external disturbant light is relatively high.

On the contrary, if the intensity of disturbant light is high, the impedance of a light receiving element selected by the third multiplexer 106 is lowered. Consequently, the output of the comparator 107 is reversed so that the comparator 107 now delivers to the memory 110 a signal instructing the driving adjusting circuit 110 to lower the light transmittivities of the light amount adjusting means 103a, 103b while a signal instructing the fourth multiplexer 111 to select the output of the second light emitting element driving circuit 114 for driving the light emitting elements of the light emitting element arrays 101a, 101b to emit light by a light amount of a high level is delivered to the fourth multiplexer 111. Consequently, the transmittivities of the light amount adjusting means 103a, 103b are lowered so that even if disturbant light of a high intensity is introduced, the amount of light to be received by the light receiving element is adjusted to a sufficiently low level. Accordingly, the impedance of the light receiving element while only disturbant light is received is sufficiently high as seen at a in FIG. 7 comparing with the saturation level. Since here the amount of light emitted from the light emitting element has been increased, if the amount of light is reduced by the light adjusting means 103a, 103b, a sufficient amount of light of a light signal will be received by the light receiving element to lower the impedance of the light receiving element significantly as seen at b in FIG. 7. Accordingly, reception of light can be detected assuredly. It is to be noted that a chain line c in FIG. 7 indicates a level of the impedance of a light receiving element when the light receiving element is driven to emit light by a light amount of a low level by the first light emitting element driving circuit 113, and it can be seen that the changing degree in impedance of the light receiving element caused by reception of light of a light signal is small.

It is to be noted that while in the embodiment described above the intensity of disturbant light is detected from a light receiving element of the light receiving element array 102a, 102b, an additional light receiving element for detecting disturbant light may otherwise be provided independently of the light receiving element arrays 102a, 102b. Or otherwise, the intensity of disturbant light introduced to either one of the light receiving element arrays 103a, 103b of the directions of the X- and Y-axes may be detected during driving scanning in the direction of the X-axis. Or else, disturbant light may be detected for each of the light receiving elements in order to adjust the light transmittivity of a portion of the light amount adjusting means 103a, 103b corresponding to the light receiving element, or otherwise the intensity of disturbant light may be detected by two light receiving elements one for each of the directions of the X- and Y-axes. Further, the light transmittivities of the light amount adjusting means 103a, 103b and the level of amount of light emitted from the light emitting elements may be varied continuously in response to the intensity of disturbant light.

As apparent from the foregoing description, according to the present invention, if external light of a high intensity acts upon an optical coordinate input device to cause the possibility that an output value of a light receiving element may reach a saturation condition, light amount adjusting means is controlled by controlling means to lower the light transmittivity thereof. Consequently, light receiving elements are normally maintained in an unsaturated condition in which they can detect light emitted from opposing light emitting elements. Accordingly, an error of operation of the light receiving elements caused by external light can be prevented assuredly, and there is no possibility that the light receiving elements may be destroyed by external light of a high intensity.

Accordingly, in the optical coordinate input device of the invention, if disturbant light of a high intensity is introduced at the light receiving elements, the light receiving elements will not be brought into a saturated or a near saturated condition. Accordingly, there is an excellent effect that the degree of change in impedance of the light receiving elements caused by reception of light of a light signal can be sufficiently great and consequently reception and interruption of light of a light signal can be detected with accuracy while there is no possibility that coordinate signals in error may be produced from the optical coordinate input device.

Having now fully described the invention, it will be apparent to one of ordinary skill in the art that may changes and modifications can be made thereto without departing from the spirit and scope of the invention as set forth herein.

What is claimed is:

1. In a coordinate input device of the light detection type which includes an optical element train in the form of a framework which is constituted from a large number of light emitting elements and a large number of corresponding light receiving elements both arranged in rows and wherein a position at which light paths defined in front of a display surface of a display device between said light emitting elements and said light receiving elements are interrupted is detected to input coordinates of the position on the display surface of the display device, the improvement which comprises light amount adjusting means of the transmissive type located in front of light receiving portions of said light receiving elements, and controlling means for controlling the amount of light to be passed through said light amount adjusting means in response to an amount of light incident to said light receiving elements.

2. A coordinate input device of the light detection type according to claim 1, wherein said light amount adjusting means includes a liquid crystal plate of the transmissive type.

3. A coordinate input device of the light detection type according to claim 1, wherein said passing light amount adjusting means include PLZT therein.

4. In an optical coordinate input device of the type wherein a large number of light emitting elements are arranged in rows along two sides of directions of the X- and Y-axes while a large number of light receiving elements are arranged in rows along the other two sides of the directions of the X- and Y-axes and in an opposing relationship to said light emitting elements, and said light emitting elements are scanned to be selectively driven one after another to emit light while those of said light receiving elements which oppose to the selectively driven light emitting elements are selected successively whereby coordinate signals are obtained from positions of those of said light receiving elements which do not receive light signals emitted from the selectively driven light emitting elements, the improvement which comprises passing light amount adjusting means located in front of said light receiving elements and including a crystal optical function element having an electro-optical effect or a magneto-optical effect or else an acoustic-optical effect, disturbant light detecting means for detecting the intensity of disturbant light introduced to said light receiving elements, light emitting element driving means for adjusting the amount of light to be emitted from said light emitting elements in response to a detection signal from said disturbant light detecting means, and driving adjusting means for adjusting the light transmittivity of said passing light amount detecting means in response to the detection signal from said disturbant light detecting means.

5. An optical coordinate input device according to claim 3, wherein the intensity of disturbant light is detected by said disturbant light detecting means from one of said light receiving elements which does not oppose to the selectively driven light emitting elements.

* * * * *

UNITED STATES PATENT AND TRADEMARK OFFICE
CERTIFICATE OF CORRECTION

PATENT NO. : 4,771,170
DATED : September 13, 1988
INVENTOR(S) : Hasegawa, et al

It is certified that error appears in the above-identified patent and that said Letters Patent is hereby corrected as shown below:

Title page:

Item [19], "Hasegawa" should read -- Hasegawa, et al --.

Item [75], add as co-inventors -- Junichi Ohouchi, Furukawa, Japan
Hiroaki Sasaki, Furukawa, Japan --.

Signed and Sealed this

Fourth Day of April, 1989

Attest:

DONALD J. QUIGG

*Attesting Officer*  *Commissioner of Patents and Trademarks*